United States Patent
Fitzgerald, Jr.

(10) Patent No.: US 6,205,037 B1
(45) Date of Patent: Mar. 20, 2001

(54) OVERLOAD PROTECTION FOR A SWITCH MODE POWER SUPPLY

(75) Inventor: William Vincent Fitzgerald, Jr., Zionsville, IN (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 09/468,667

(22) Filed: Dec. 21, 1999

(51) Int. Cl.[7] .................. H02M 3/335; H02M 3/24; H02M 7/537

(52) U.S. Cl. ..................... 363/21; 363/97; 363/131

(58) Field of Search .................. 363/21, 97, 98, 363/127, 131, 132, 56, 80; 323/222, 282, 268

(56) References Cited

U.S. PATENT DOCUMENTS

| | | | |
|---|---|---|---|
| 3,893,006 | 7/1975 | Algeri et al. | 317/3 |
| 4,037,271 | 7/1977 | Keller | 363/21 |
| 4,058,758 | 11/1977 | Peterson | 363/80 |
| 4,063,307 | 12/1977 | Stephens | 363/21 |
| 4,263,643 | 4/1981 | Koike | 363/19 |
| 4,561,047 | 12/1985 | DePuy | 363/56 |
| 4,672,524 | 6/1987 | Toriyama et al. | 363/56 |
| 4,686,617 | 8/1987 | Colton | 363/56 |
| 4,763,238 | 8/1988 | Maige | 363/21 |
| 4,928,200 | 5/1990 | Redl et al. | 361/93 |
| 5,028,861 | 7/1991 | Pace et al. | 323/222 |
| 5,101,336 | 3/1992 | Willcox et al. | 363/41 |
| 5,171,949 | 12/1992 | Fijishima et al. | 219/10.55 |
| 5,267,133 | * 11/1993 | Motomura et al. | 363/21 |
| 5,335,162 | * 8/1994 | Martin-Lopez et al. | 363/97 |
| 5,350,997 | * 9/1994 | Ghotbi et al. | 323/268 |
| 5,521,807 | * 5/1996 | Chen et al. | 363/21 |
| 5,600,546 | * 2/1997 | Ho et al. | 363/21 |
| 5,835,361 | 11/1998 | Fitzgerald | 363/21 |
| 5,877,946 | 3/1999 | Fitzgerald | 363/21 |

OTHER PUBLICATIONS

TEA 2260 High Performance Driver Circuit for SMPS, Appln. Note SGS–Thomson Microelectronics, Apr. 1989, pp. 1–47.

* cited by examiner

*Primary Examiner*—Peter S. Wong
*Assistant Examiner*—Rajnikant B. Patel
(74) *Attorney, Agent, or Firm*—Joseph S. Tripoli; Harvey D. Fried; Sammy S. Henig

(57) ABSTRACT

When a main switching transistor of a zero voltage switching power supply is conductive, a voltage is developed in a current sensing resistor coupled in series with the transistor. The voltage in the current sensing resistor is coupled to a first input of a comparator of the control circuit. A second input of the comparator is coupled to a capacitor that develops a voltage that varies in accordance with an output voltage of the power supply. During a given conduction interval of the transistor, the comparator is triggered in accordance with the difference between the current sensing resistor voltage and the capacitor voltage. An output of the comparator is coupled to the base of the transistor for controlling the turn off instant of the transistor on a current pulse-by-current pulse basis. Under overload condition, when the transistor is turned off, a reverse collector current flows through the base-collector junction of the transistor. The reverse collector current produces a voltage in the current sensing resistor that is at opposite polarity with respect to the voltage there, during forward conduction of the transistor. The voltage produced by the sensed reverse current turns on a diode switch and charges the capacitor that is coupled to the comparator of the control circuit in a manner to reduce the peak forward collector current. Thereby, the peak forward current in the transistor decreases relative to a value that would have occurred without the protection.

9 Claims, 2 Drawing Sheets

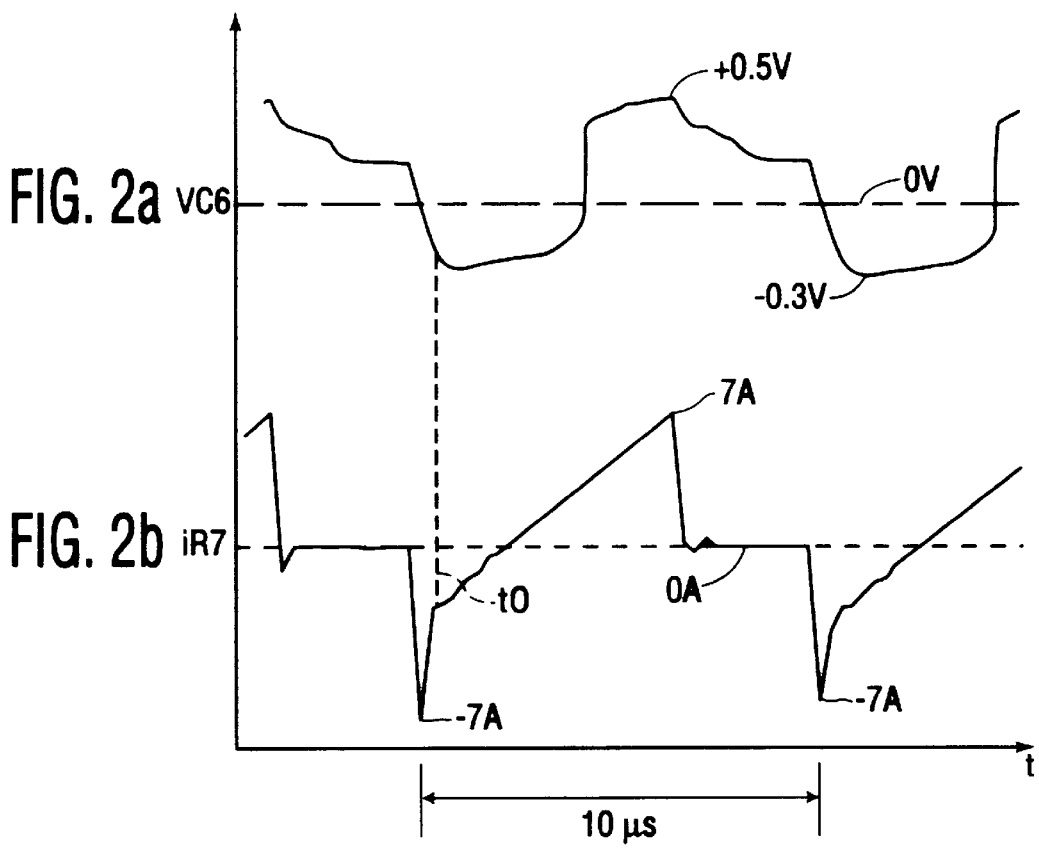

OVERLOAD PROTECTION FOR A SWITCH MODE POWER SUPPLY

Figure 1:
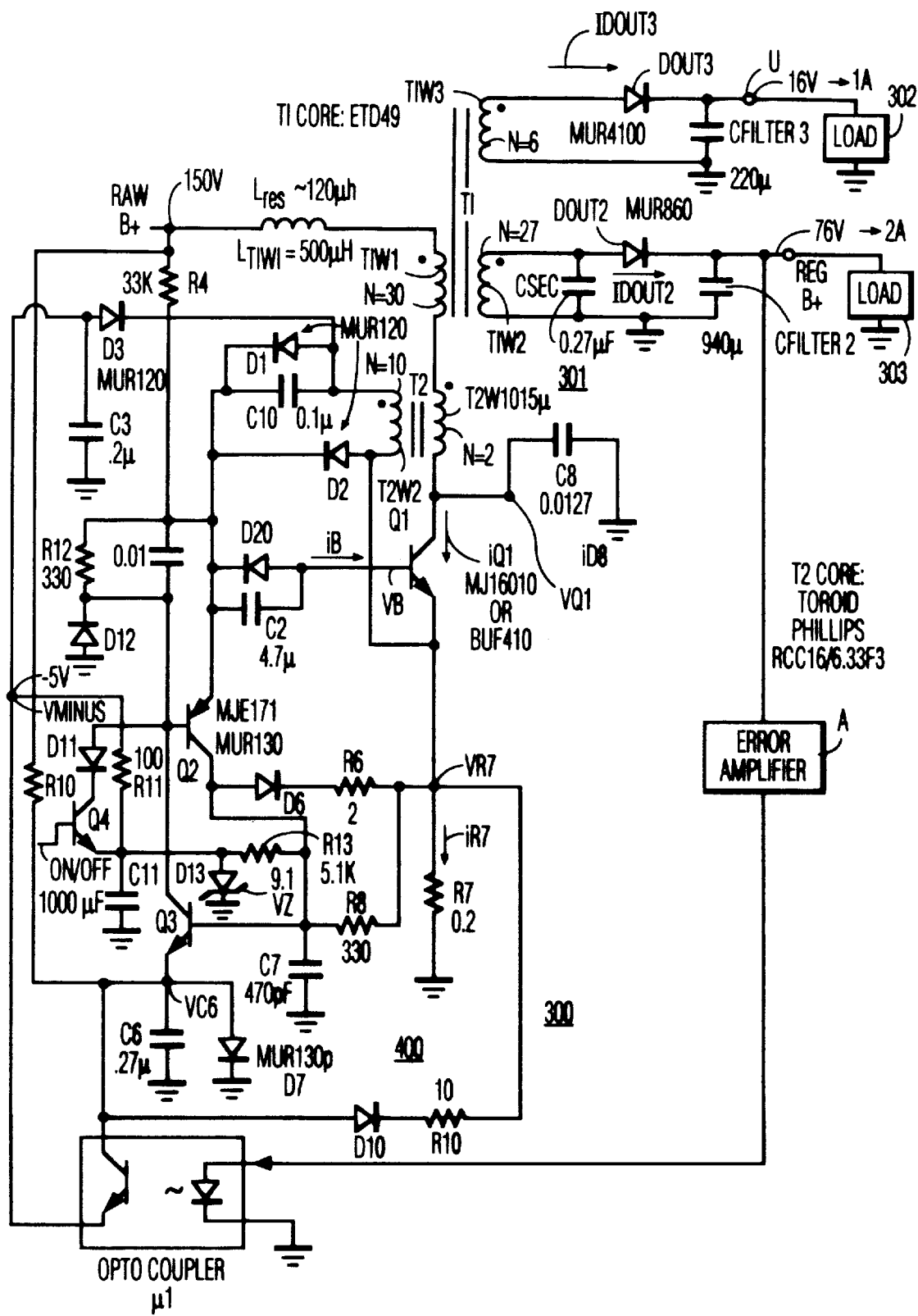

The invention relates to a protection circuit of a power supply.

BACKGROUND

A power supply operating in the Zero Voltage Switching (ZVS) and forward modes described in U.S. Pat. No. 5,877, 946 issued Mar. 2, 1999, entitled A FORWARD CONVERTER WITH AN INDUCTOR COUPLED TO A TRANSFORMER WINDING, in the name of W. V. Fitzgerald (the Fitzgerald patent), includes a main switching transistor coupled to a primary winding of a main power transformer. Output supply voltages are developed from voltages developed in secondary windings of the transformer. When the transistor is conductive, a current pulse is developed in the primary winding of the transformer and in the transistor. A voltage is also developed in a current sensing resistor coupled in series with the transistor. The voltage in the current sensing resistor is coupled to a first input of a comparator of a control circuit. A second input of the comparator is coupled to a capacitor that develops a voltage varying in accordance with an output voltage of the power supply for providing regulation.

During a given conduction interval of the transistor, the comparator is triggered when the current sensing resistor voltage exceeds a threshold voltage of the comparator established by the capacitor voltage. Ann output of the comparator is coupled to the base of the transistor for controlling the turn off instant of the transistor on a current pulse-by-current pulse basis.

In normal operation, a voltage, present across the primary of the main power transformer, reduces the voltage across the supply inductance. This voltage is proportional to the output voltage produce in a given secondary winding of the transformer. The output voltage produces from the secondary winding is stepped up by the turns ratio of the transformer. When the switching transistor turns off at the end of each cycle, a negative voltage pulse, reflected from the secondary side of the transformer reduces the collector voltage of the transistor.

Excessive collector voltage may be developed in the main switching transistor if an overload condition occurs in one of the secondary winding. The over-voltage is caused by excessive circulating current in a resonant supply inductance which resonates with a resonate capacitor that are coupled to the collector of the main switching transistor to form ZVS.

If a severe overload occurs on one of the secondary windings, which causes the power supply to fall out of regulation, the voltage across the primary winding of the transformer also drops since the voltage reflected by the turns ratio of the transformer is reduced. The result is that the collector voltage of the transistor may become excessive.

When the output voltage produced from the secondary winding falls out of regulation, a maximum current limit is established by the control circuit. Under an overload condition, the transistor will still allow the maximum current to flow through the supply inductance. However, energy stored in the supply inductance is not delivered to the load through the transistor. The stored energy produces resonant current in the resonant current in the resonant capacitor when the transistor is turned off at the end of the cycle and causes the collector voltage of the transistor to rise substantially above the normal operating voltage, possibly exceeding the breakdown voltage rating of the transistor. Since, under overload, the energy that is stored in the supply inductance during each cycle is not delivered to the load, the energy returns back to the unregulated supply that energizes the transistor via a reverse or negative current. It may be desirable to reduce the resulting excessive collector voltage.

SUMMARY

In carrying out an inventive aspect, the reverse negative current is routed through the base-collector junction of the transistor, when the transistor is turned off, in a direction opposite to the forward collector current. The forward collector current occurs when the transistors turned on. The reverse collector current produces a voltage in the aforementioned current sensing resistor, at opposite polarity with respect to its polarity, during forward conduction of the transistor. During an overload, the voltage produced by the sensed reverse current turns on a diode switch and changes a charge in the capacitor that is coupled to the second input of the comparator of the control circuit in a manner to reduce the peak forward collector current. Thereby, the peak forward current in the transistor decreases relative to a value that would have occurred without the protection. The result is that excessive collector voltage is, advantageously, prevented.

IN THE FIGURES

FIG. 1 illustrates a schematic diagram showing an exemplary embodiment of the circuit of the invention; and FIGS. 2a and 2b illustrate waveforms useful for explaining the operation of the circuit of FIG. 1.

DETAILED DESCRIPTION

FIG. 1 illustrates an zero voltage switching forward converter or power supply 300. A protection circuit 400, embodying an inventive feature, provides protection to zero voltage switching power supply 300. Zero voltage switching power, supply 300 operates similarly in many respects to that described in the Fitzgerald patent.

Power, for example, 200 watts, is supplied toa load 303 and to a load 302 coupled to a secondary winding T1W2 and a secondary winding T1W3, respectively, of a transformer T1, during conduction time of a switching transistor Q1. Transistor Q1 that operates as a switch is coupled in series with a primary winding T1W1 of transformer T1 for conducting current from an input supply, direct current (DC) voltage RAW B+. A current transformer T2, considered a drive transformer, supplies a base current iB to switching transistor Q1. Voltage RAW B+ can be derived from a bridge rectifier (not shown) that rectifies a mains supply voltage, and is coupled toa filter capacitor (not shown).

Also coupled to the emitter of transistor Q1 in series with transistor Q1 is a current sensing resistor R7. A resonant capacitor C8 is coupled to primary winding T1W1 and to the collector of transistor Q1. A resonant circuit 301 includes capacitor C8, a reflected capacitance CSEC, a current limiting supply inductor Lres, primary winding T1W1 and a primary winding T2W1 of transformer T2. Primary winding T1W1 is coupled in series with the primary winding T2W1 of current transformer T2.

Resonant circuit 301 produces a half cycle resonant voltage VQ1 each cycle when transistor switch Q1 is turned off. A collector voltage VQ1 across transistor Q1 (and on capacitor C8) rises to a peak and then fall to approximately zero in a substantially sinusoidal half wave. After resonant voltage VQ! becomes close to zero, a series arrangement of resistor R7, a diode D2, a zener diode D20, coupled in parallel with a capacitor C2, and the base-collector junction of transistor Q1 form a low impedance that clamps voltage VQ1 to a voltage close to ground potential. Transistor Q1 is then switched on again at approximately zero volts to provide zero voltage switching.

A secondary winding T1W3 of transformer T1 is coupled to an anode of a rectifier diode DOUT3, the cathode of which is coupled to a filter capacitor CFILTER3. Winding T1W3 is coupled via a low impedance current path, during forward conduction operation, to filter capacitor CFILTER3 and to load 302. Similarly, a secondary winding T1W2 is coupled through rectifier diode DOUT2 to filter capacitor CFILTER 2 to provide output voltage REG B+.

Capacitor CSEC may be included in one or both of the secondary winding circuits T1W2 and T1W3 in parallel with the winding. Capacitor CSEC is transformer coupled to winding T1W1 forming a part of resonant circuit 301.

Advantageously, each of winding T1W2 and T1W3 is tightly coupled to primary winding T1W1 in transformer T1 in a manner to reduce leakage inductance. Inductance $L_{res}$ on the primary side of the transformer T1 is transformer coupled to limit the rate of change of each of currents IDOUT3 and IDOUT2 in the current paths that includes diodes DOUT3 and DOUT2, respectively, during forward conduction. Advantageously, inductance $L_{res}$ is shared in common with each of windings T1W2 and T1W3.

When transistor Q1 is conductive, advantageously, a current produced in a secondary winding T2W2 is proportional to the current in primary winding T2W1 of transformer T2. Winding T2W1 of transformer T2 is coupled in series with winding T1W1 of transformer T1 and switching transistor Q1. Therefore, a base current iB varies approximately linearly with the collector current iQ1. Advantageously, over-driving of the base of transistor Q1 is prevented by a proportional drive technique.

Control of the duty cycle of transistor switch Q1 is based on, for example, sensing output voltage REG B+ directly, rather than output voltage U. An error amplifier A is responsive to the voltage REG B+, and can include, for example, a comparator having inputs coupled to output voltage REG B+ and to a voltage divider providing a predetermined threshold. Error amplifier A is optically coupled through an opto-coupler μ1 to control a triggering level or threshold of a comparator transistor Q3.

The voltage at the emitter of transistor Q3 is developed from the charge in a capacitor C6. The emitter voltage in capacitor C6 is limited to a forward diode drop by a diode D7, coupled to ground. The charge in capacitor C6 is replenished while transistor Q3 is conducting and is drained by opto-coupler μ1 when it conducts in response to an output signal of error amplifier A.

When transistor Q1 is conductive, a voltage VR7 across resistor R7, which is proportional to the current level in transistor Q1, is coupled to the base of a comparator transistor Q3. Current-representative voltage VR7 is resistor R7 is coupled to a filter capacitor C7 through a resistor R8. A voltage developed in capacitor C7 from voltage VR7 is coupled to the base of transistor Q3.

In a given conduction cycle of transistor Q1, when the base voltage of transistor Q3 exceeds a threshold voltage of transistor Q3 that is determined by a control voltage VC6, developed in capacitor C6 at the emitter of transistor Q3, by an amount sufficient to forward bias the base-emitter junction, transistor Q3 begins conducting. Thus, transistor Q3 begins conducting, when a current iQ1 in transistor Q1 develops voltage VR7 in resistor R7 that exceeds the threshold voltage of transistor Q3. When transistor Q3 conducts, it forms a regenerative latch with a transistor Q2. The collector of NPN transistor Q3 is coupled to the base of PNP transistor Q2 and the collector of transistor Q2 is coupled to the base of transistor Q3, forming a regenerative switch. The emitter of transistor Q2 is coupled back to the base of switching transistor Q1 via diode D20 and a capacitor C2, coupled in parallel.

When the latch formed by transistors Q2 and Q3 is triggered, transistor Q2 draws current away from the base of switching transistor Q1. A control voltage coupled to the base of switching transistor Q1 is developed at the emitter of transistor Q2. The emitter voltage of transistor Q2 forms an output of the regenerative switch arrangement and is coupled to the base of transistor Q1 to turn off transistor Q1 when the latch formed by transistors Q2 and Q3 is triggered.

Secondary winding T2W2 of current transformer T2 provides base current iB of switching transistor Q1. The voltage across winding T2W2 is an alternating current (AC) voltage, produced when switching transistor Q1 alternately conducts and is turned off. Advantageously, when transistor Q1 is turned on, transformer T2 provides proportional drive current iB to transistor Q12 for maintaining transistor Q1 in saturation without over-driving transistor Q1. On the other hand, immediately after transistor Q1 is turned off by the operation of transistors Q2 and Q3, resonant voltage VQ1 at the collector of transistor Q1 is coupled to the base of transistor Q1 via winding T2W2 in a manner to maintain transistor Q1 nonconductive.

A collector of an on/off transistor Q4 is coupled via a diode D11 to the emitter of transistor Q2. When transistor Q4 is conductive, in accordance with an on/off signal ON/OFF, a base current is produced in transistor Q2 that causes transistor Q1 to stay nonconductive. The emitter current of transistor Q4 produces forward conduction in a zener diode D13. Diode D13 is coupled in parallel with a slow start capacitor C1 that are coupled to the emitter of transistor Q4.

Start-up of the oscillation cycles occurs when transistor Q4 is turned off and causes transistor Q2 to turn off. Thereafter, a current starts flowing through a resistor R4 and through the parallel arrangement of zener diode D20 and capacitor C2 and produces a start-up base current iB in switching transistor Q1. Resistor R4 is large, and provides only a small amount of start-up base current drive to transistor Q1. As transistor Q1 begins conducting, current transformer T2 causes a current to flow in secondary winding T2W2. The current in secondary winding T2W2 is proportional to the current in primary winding T2W1, as a function of their turns ratio. Diode D1 and a parallel capacitor C10 are coupled in series with secondary winding T2W2 and with the parallel arrangement of zener diode D20 and capacitor C2 to produce the base current iB of transistor Q1. The added base drive current attains saturation for the added collector current in a regenerative manner, causing base current iB to increase in proportion to the increase in collector current iQ1. When transistor Q1 saturates, collector current iQ1 continues to increase by a rate determined by the total supply inductance coupled in series with the collector of transistor Q1.

When the voltage across current sensing resistor R7 is sufficient to cause transistor Q3 to conduct, triggering current is provided at the base of transistor Q2. Transistor Q2 conducts and causes an increase in the voltage at the base of transistor Q3 by producing additional drive current in capacitor C7 and also operating in a regenerative manner to latch on. The low impedance developed at the emitter of latched drive transistor Q2 quickly removes the base charge from the base of switching transistor Q1. The result is that transistor Q1 is quickly turned off.

During the time that transistor Q1 is conducting, positive current flows into the base through the diode D20 and capacitor C2, which causes capacitor C2 to charge to several volts. The voltage in capacitor C2 is more positive on the terminal of capacitor C2 that is remote from the base of transistor Q1 and less positive at the base of transistor Q1. Therefore, when transistors Q2 and Q3 latch, they provide a low impedance path to ground, causing the voltage on capacitor C2 to apply a negative bias to the base of transistor Q1.

A diode D6 and a resistor R6, coupled in series between the collector of transistor Q2 and current sensing resistor R7, shunt some of the reverse base current to resistor R7, which is low in impedance, for example a fraction of an ohm. This shunting reduces the tendency to overdrive the base of transistor Q3, which would otherwise cause excessive storage time and poor switching performance.

After transistor Q1 is turned off, transformer T2 winding T2W2 produces a negative voltage across a diode D2, having an anode that is coupled to the emitter of transistor Q1. Drive control transistors Q2 and Q3 remain latched until the current flowing through them drops below a threshold needed to keep them regeneratively latched. Thereafter, the negative voltage across diode D2 keeps transistor Q1 from conducting. In addition, a diode D3 and a capacitor C3 are coupled to rectify and filter the negative voltage produced by transformer T2 to produce a negative supply voltage VMINUS.

The resonant action of resonant circuit 301 causes the base-emitter voltage to reverse polarity via winding T2W2. When the voltage at the base of switching transistor Q12 increases to a sufficient magnitude, current begins flowing in the base of transistor Q1, producing collector current that grows regeneratively, as explained before, forming the beginning of the next cycle. Collector current iQ1 in transistor Q1 begins flowing when collector voltage VQ1 is at zero volts. Thereby, zero voltage switching is obtained.

Advantageously, current transformer T2 provides for self-oscillations. In the circuit coupled to secondary winding T2W2 of transformer T2, diode D2 limits the negative voltage developed during the time off of transistor Q1. Because diode D1 and capacitor C10 form a low impedance, transformer T2 operates as a current transformer during the turn off interval. Diode D1 provides a current path for the forward drive current and also limits the voltage in capacitor C10, in parallel with diode D1, to the forward voltage developed across diode D1 when conducting. Diode D1, capacitor C2 and the base-emitter junction of transistor Q1 form a low impedance operates as a current transformer. Advantageously, by operating as a current transformer, transformer T2 need not have to store large magnetic energy and can have a small core.

During the start-up interval, voltage VMINUS produces a charge current in a resistor R11 that is coupled to capacitor C11, causing a start-up, ramp negative voltage in capacitor C11. The ramp voltage in capacitor C11 is coupled via a resistor R13 to resistor R8. Consequently, the threshold voltage of comparator transistor Q3 varies in a ramping manner to provide slow start operation. Voltage VMINUS is also coupled to the emitter of the phototransistor in opto-coupler μ1. The charge on capacitor C6 is adjusted by conduction of the phototransistor of opto-coupler μ1, responsive to signals from error amplifier A. In this manner the voltage is closely regulated on a current pulse basis.

In normal operation, a voltage is present across primary winding T1W1 of main power transformer T1 which reduces the voltage across current limiting inductance $L_{res}$. This voltage is proportional to output voltage REG B+ approximately multiplied by the turns ratio of windings T1W2 and T1W1. When transistor Q1 turns off at the end of each cycle, a negative voltage pulse, reflected from the secondary side of transformer T1, counteracts the positive pulse that appears on a terminal of current limiting inductance $L_{res}$, close to the collector of transistor Q1. Thus, advantageously, the collector voltage VQ1 of transistor Q1 is reduced.

A severe overload may occur in, for example, secondary winding T1W2. Consequently, the power supply may cease regulating in a negative feedback loop manner. Therefore, voltages REG B+ and U will decrease. Consequently, the voltage across primary winding T1W1 of main power transformer T1 that is reflected by the turns ratio of the transformer also drops. The result is that the aforementioned reflected negative pulse is greatly reduced, causing the collector voltage VQ1 across primary winding T1W1 of main power transformer T1 to rise substantially more than under normal, non-overload conditions.

During severe overload, voltages REG B+ and U decrease because of loss of regulation. A maximum current limit is established on a current pulse-by-current pulse basis by the control circuit that includes transistors Q2 and Q3. Under an overload condition, transistor Q1 will still allow maximum current iQ1 to flow through the supply inductance that includes current limiting inductance $L_{res}$. However, energy stored in, for example, current limiting inductance $L_{re}$ is not delivered to the load through transformer T1. The stored energy is developed in resonant circuit 301, when transistor Q1 is turned off at the end of the cycle. The increased stored energy causes the collector voltage VQ1 of transistor Q1 to rise substantially above the permissible normal operating voltage, possibly exceeding the breakdown voltage rating of transistor Q1.

Since the energy stored in, for example, current limiting inductance $L_{res}$ during each cycle is not delivered to the load, the energy returns back to the supply of voltage RAW B+. This returning energy, produces a reverse or negative current flowing through series arrangement of resistor R7, diode D2, zener diode D20, coupled in parallel with capacitor C2, the base-collector junction of transistor Q1 and windings T1W1 and $L_{res}$ and develops voltage VR7 across resistor R7 in a negative polarity.

FIG. 2b illustrates the waveform of a negative current iR7 in resistor R7 that produces negative voltage VR7 of FIG. 1. The positive portion of current iR7 of FIG. 2b occurs during forward conduction of transistor Q1 of FIG. 1. FIGS. 2a and 2b illustrate the effect of negative current iR7 of FIG. 2b on control voltage VC6 of FIGS. 1 and 2a. Similar symbols and numerals in FIGS. 1, 2a and 2b indicate similar items or functions.

In carrying out an inventive feature, a switch diode D10 of FIG. 1 is coupled in series with a current limiting resistor R10 between capacitor C6 and resistor R7 for decreasing control voltage VC6 of FIG. 2a developed in capacitor C6 of FIG. 1, when the negative current iR7 of FIG. 2b in resistor R7 of FIG. 1 in the vicinity of time t0 of FIGS. 2a and 2b is excessive. The reverse or negative current in FIG. 2b occurs when collector current iQ1 of transistor Q1 of FIG. 1 flows to the supply terminal, where voltage RAW B+ is developed. As explained before, reverse current iQ1 flows in a path that includes diode D2, zener diode D20, coupled in parallel with capacitor C2 and the base-collector junction of transistor Q1.

The level of control voltage VC6 of FIG. 2a in capacitor C6 of FIG. 1 determines the maximum forward current iQ1, when transistor Q1 is conductive. During overload, negative current iR7 of FIG. 2b and negative voltage VR7 across resistor R7 of FIG. 1 turn on diode D10 and cause voltage VC6 of FIG. 2a in capacitor C6 of FIG. 1 to decrease. Consequently, the peak forward current in transistor Q1 is, advantageously, reduced. Advantageously, by forcing the reduction in the peak of each forward current pulse iQ1 in transistor Q1, during overload conditions, the possibility of exceeding the voltage rating of transistor Q1 is diminished and the reliability increases. The addition of resistor R10 in series with diode D10 allows for a small time constant of capacitor C6 and resistor R10 and minimizes the peak current through diode D10.

What is claimed is:

1. A switch mode power supply, comprising:

a supply inductance coupled to a source of an input supply voltage and to a switching transistor for producing current pulses in said inductance that are coupled to an output of said power supply, a given current pulse having a first portion at a first polarity, that flows in said transistor, during a first portion of a cycle, when forward conduction occurs in said transistor, and a second portion, at an opposite polarity, during a second portion of said cycle, after said forward conduction ceases in said transistor;

a source of a first control signal having a value that is indicative of a current limit;

a control circuit coupled to said transistor and responsive to said first portion of said given current pulse and to said first control signal for limiting amplitudes of said current pulses, in a current mode on a current pulse-by-current pulse control basis, in accordance with said current limit value; and a protection circuit coupled to said control circuit and responsive to said second portion of said current pulse for varying said first control signal, in accordance with said second portion of said current pulse, to vary said current limit value, when a magnitude of said second portion is within a first range of values, the variation of said first control signal being disabled, when said magnitude of said second portion is within a second range of values.

2. A switch mode power supply according to claim 1, wherein said first control signal source comprises a capacitor and a switch responsive to said second portion of said given current pulse for storing a signal indicative of said magnitude of said second portion in said capacitor to develop said first control signal therein, during said second portion of said cycle, and for applying said stored first control signal to said control circuit, during said first portion of said cycle.

3. A switch mode power supply according to claim 1 further comprising, a capacitor coupled to said inductance to form a resonant circuit, when said transistor is nonconductive, wherein said second portion of said current pulse is produced in said resonant circuit.

4. A switch mode power supply according to claim 1 further comprising, a transformer having a first winding that is included in said supply inductance and a second winding that is coupled to a rectifier, wherein said power supply operates in a forward mode.

5. A switch mode power supply according to claim 1 further comprising, a current sensor coupled in a current path of said transistor for applying said first and second portions of said given current pulse to said control and protection circuits, respectively.

6. A switch mode power supply according to claim 5 wherein said current sensor comprises a current sensing resistor that is coupled to a main current conducting terminal of said transistor remote from said supply inductance.

7. A switch mode power supply according to claim 1 wherein said control circuit comprises a comparator having a first input responsive to said first portion and a second input responsive to said second portion of said given current pulse.

8. A switch mode power supply according to claim 1 wherein said first control signal source is responsive to an output of said power supply for varying said first control signal in accordance with a difference between said supply output and a reference signal.

9. A switch mode power supply, comprising:

a supply inductance coupled to a source of an input supply voltage and to a switching transistor for producing current pulses in said inductance that are coupled to an output of said power supply;

means coupled to said transistor for sensing current therein;

a control circuit coupled to said transistor and responsive to a first portion of an output signal of said current sensor for establishing, a current limit of a given current pulse, in a current mode on a current pulse-by-current pulse control basis, in accordance with said first portion of said output signal of said current sensor; and a protection circuit coupled to said control circuit and responsive to a second portion of said output signal of said current sensor for varying said said current limit, in accordance with said second portion of said current pulse, said second and first portions of said output signal occurring in mutually exclusive intervals.

* * * * *